United States Patent
Naka et al.

(10) Patent No.: US 7,527,434 B2
(45) Date of Patent: May 5, 2009

(54) CONNECTING MEMBER

(75) Inventors: Yasuhiro Naka, Tokyo (JP); Shinpei Todo, Tokyo (JP); Takashi Shigematu, Tokyo (JP); Takayuki Ando, Tokyo (JP); Yoshimi Ono, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/575,909

(22) PCT Filed: Sep. 26, 2005

(86) PCT No.: PCT/JP2005/017614

§ 371 (c)(1),
(2), (4) Date: Apr. 27, 2007

(87) PCT Pub. No.: WO2006/035701

PCT Pub. Date: Apr. 6, 2006

(65) Prior Publication Data

US 2008/0056644 A1 Mar. 6, 2008

(30) Foreign Application Priority Data

Sep. 27, 2004 (JP) .............................. 2004-280346

(51) Int. Cl.
*G02B 6/36* (2006.01)

(52) U.S. Cl. .............................. 385/78; 385/80; 385/72; 385/76

(58) Field of Classification Search .............. 385/72–81
See application file for complete search history.

(56) References Cited

U.S. PATENT DOCUMENTS

| 5,259,050 A | * | 11/1993 | Yamakawa et al. ............ 385/59 |
| 6,945,701 B2 | * | 9/2005 | Trezza et al. .................. 385/53 |
| 7,121,733 B2 | * | 10/2006 | Hengelmolen et al. ........ 385/78 |
| 7,149,400 B2 | * | 12/2006 | Lange et al. ................. 385/137 |

FOREIGN PATENT DOCUMENTS

| JP | 06-278157 | 10/1994 |
| JP | 10-186175 | 7/1998 |

OTHER PUBLICATIONS

International Search Report Dated Nov. 28, 2005 for PCT/JP2005/017614.

* cited by examiner

*Primary Examiner*—Frank G Font
*Assistant Examiner*—Eric Wong
(74) *Attorney, Agent, or Firm*—Knoble Yoshida & Dunleavy, LLC

(57) ABSTRACT

A connecting member which is formed by filling a mold with a resin composition and then solidifying the resin composition, the connecting member having one end face in which a plurality of fine holes of a $\phi$ or less are arrayed in a row with a pitch P therebetween, and guide pin insertion holes are formed on either side of the fine holes, wherein the resin composition is comprised of a resin and a filler mixed therein, and wherein the space (P–a) between the fine holes meets the following formula; Dm<(P–a)<Dmax, in which Dmax represents the largest diameter of the filler particles, and Dm represents the most frequent diameter of the filler particles.

10 Claims, 7 Drawing Sheets

FILLER PARTICLE DIAMETER

FILLER PARTICLE DIAMETER $$Lf \geq 2*\sqrt{R^2-(R-\frac{\Delta}{2})^2}$$

WHERE CURVATURE R= 30a1/0.125

CONNECTING MEMBER

TECHNICAL FIELD

The present invention relates to connecting members manufactured by molding or forming using a mold.

BACKGROUND ART

A connecting member such as a fiber optic connector has a plurality of fine holes 12, as shown in FIG. 9, which are formed in one end face 11 of the connecting member and equally spaced by a predetermined pitch P so that the fine holes 12 are arrayed in a row, guide pin insertion holes 13 which are formed on either side of the fine hole array 12, and optical fiber insertion holes 15 which are formed in the other end face 14 opposite to the end face 11 to communicate with the fine holes 12, respectively.

These connecting members are manufactured using a mold, such as the one 20 shown in FIG. 10. The mold 20 comprises a pin mold 25 in which a plurality of pins 21 for forming the fine holes are arrayed in the width direction of the mold, pins 23 for forming the guide pin insertion holes are formed on either side of the pin array 22 of the fine hole forming pins 21, a pin holder 24 supports one end of these fine hole forming pins 21, and the end of the pin holder 24 and one end of the pins 23 for forming the guide pin insertion holes are supported on the pin mold 25 base. The mold 20 further comprises a lower mold 30 in which a positioning member 28 has a plurality of pin receiving holes 26 arrayed to correspond to the fine hole forming pins 21 such that the fine hole forming pins 21 are adapted to be inserted through these holes 26, and another plurality of pin receiving holes 27 configured such that the pins 23 for forming the guide pin insertion holes are inserted in these holes 27. The mold 20 further comprises an upper mold 31 which is used to place above the lower mold 30 to cover the same and accommodate the pin mold 25 therein.

A connecting member 10 is produced as follows: The leading ends 21' of the fine hole forming pins 21 and the leading ends 23' of the pins 23 for forming the guide pin insertion holes are inserted in the pin receiving holes 26 for the fine hole forming pins, and the pin receiving holes 27 for the pins for forming the guide pin insertion holes, respectively. Then, from a resin injection nozzle (not shown), a resin composition is injected into the inner space of the mold surrounded by the upper mold 31, the lower mold 30, the positioning member 28 and the pin mold 25 so that the injected resin composition will be hardened therein into a molded product.

The resin composition used for the molding is comprised of a resin or plastic material and a filler mixed in the resin. In the conventional art, the size of filler particles is chosen to be less than the space formed between the fine hole forming pins 21 in order that the resin composition can easily pass through the space between the fine hole forming pins 21. (See for example, Patent Document D1)

Such a fiber optic connector is used to connect optical cables. Typically, for the connection, optical glass fibers having an outer diameter of 125 μm are arrayed with the fiber-to-fiber distance of 250 μm.

The recent development of optical connection technology or "interconnection" technology for optically interconnecting CPU boards requires higher density of the spacing; for example, the fiber-to-fiber distance or pitch of 125 μm has been proposed. To address such high density requirement, the pitch of the fiber optic connector has to be made smaller accordingly.

In general, the use of resin composition containing filler particles of small diameters improves the transfer rate of the resin composition so that a molded product having reduced surface roughness is produced. (Lecture Papers of Plastic Working Spring Lecture Meeting, P 145, 2004 "Development of Transfer Assessment Using Accurate and Fine Mold")

FIGS. 11 and 12 illustrate frequency distributions of diameters of the filler particles in the resin. FIG. 11 shows a resin composition A in which filler particles of 30 μmφ diameter have the maximum or highest frequency and the largest or maximum filler particle diameter is as large as 100 μmφ. FIG. 12 shows another resin composition B in which filler particles of 30 μmφ diameter have the highest frequency and the largest filler particle diameter is limited to 60 μmφ. FIG. 13 shows transfer rates of molded products using these resin compositions. FIG. 14 shows surface roughness of the molded products using these resin compositions. As seen from FIGS. 13 and 14, the molded product using the resin composition B containing relatively smaller sized filler particles has better transfer rate and better surface roughness than those of the molded product using the resin composition A.

Therefore, it is expected that the connecting member disclosed in the patent document D1 has improved properties in terms of the transfer rate and the surface roughness.

Patent Document D1: Japanese Patent Application Publication 2004-86089

SUMMARY OF THE INVENTION

Problem to be Solved

However, the above mentioned conventional connecting members have the problems as follows: In general, to attain a smaller-sized connecting member with higher density and integration, and multiplicity of optical fibers, it is necessary to make smaller the pitch between the fine holes than that of the conventional connecting member. In addition, it is necessary to provide higher manufacturing accuracy of the connecting end face (corresponding to the one end face 11) of the connecting member.

More specifically, according to the Patent Document D1, all filler particles are sized to be able to pass the space formed between the fine hole forming pins 21: for example, for the space of 35 μm between the fine hole forming pins 21, filler particles having diameters less than 30 μm are used. The molded connecting member using the resin composition containing such filler particles has a uniform distribution of filler particles therein. As a result, the hardness of the resin around the array 12' of the fine holes 12 is made essentially the same as the hardness of the resin between the fine holes 12. Hence the fine holes 12 cannot keep their dimensional accuracy since any external stress can deform the fine holes 12.

Solution

With the problems in mind, the present invention provides a connecting member in which filler particles having relatively small diameters are distributed between fine holes of the connecting member whereas filler particles having relatively large diameters are distributed around the array of the fine holes so that an outer portion surrounding the array of the fine holes has relatively high hardness, thus assuring dimensional accuracy of the fine holes.

A first aspect of the present invention provides a connecting member made of a resin composition, including one end face in which a plurality of fine holes are arrayed in a horizontal row with a pitch P therebetween, each hole having a diameter of a φ, and guide pin insertion holes are each formed on either side of the array of the fine holes, wherein:

the resin composition contains a resin and filler particles mixed therein; and wherein the filler particles contained in the resin composition have a particle size distribution such that a space (P−a) formed between the fine holes meets the following formula;

$$Dm<(P-a)<Dmax$$

in which Dmax represents a largest diameter of the filler particles, and Dm represents a most frequent diameter of the filler particles.

A second aspect of the connecting member is further configured such that the space (P−a) between the fine holes meets the following formula;

$$Dm<(P-a)\leq Dc$$

in which Dc represents a diameter of the filler particles for which filler particles having diameters between the diameter Dc and the largest diameter account for 20% of the total number of the filler particles.

A third aspect of the present invention provides a connecting member wherein the plurality of fine holes are spaced by the pitch P therebetween to form an array in one horizontal row or a plurality of horizontal rows with a vertical distance therebetween, wherein:

a row-to-row distance of the fine holes is given by h which is, however, zero when the number of the rows of the fine holes is one, a diameter of the guide pin insertion holes is given by bφ, a space formed between each one of the guide pin insertion holes and nearest one of the fine holes is given by x, a center-to-center horizontal distance between each one of the guide pin insertion holes and the nearest one of the fine holes is given by L1, wherein:

the following formula is met;

$$1<(x/(P-a))<10,$$

in which x is given by $x=(L1^2+(h/2)^2)^{0.5}-a/2-b/2$

A fourth aspect of the present invention provides a connecting member of claim 3 wherein the following formula is met;

$$0.5<((x/(P-a))/(b/a))<2.$$

A fifth aspect of the present invention provides a connecting member wherein the following formula is also met;

$$x/x0 = 0.3 \text{ to } 3,$$

in which x0 represents a space formed between a side face of the connecting member and each one of the guide pin insertion holes.

A sixth aspect of the present invention provides a connecting member wherein optical fibers are accommodated in the fine holes.

A seventh aspect of the present invention provides a connecting member wherein hollow tubes are accommodated in the fine holes.

A eighth aspect of the present invention provides a connecting member further comprising another end face opposite to the one end face, wherein the other end face is provided with a linear element arranging unit in which a plurality of linear elements covered with a coating are arranged, wherein a cavity is formed between the linear element arranging unit and the fine holes of the connecting member, the fine holes are formed in the one end face, and the fine holes communicate with the linear element arranging unit via the cavity so that the linear elements with the coating removed are accommodated in the fine holes such that the linear elements with the coating removed are arranged with a bend in the cavity, wherein:

the cavity has a length Lf in the longitudinal direction of the fine holes, the length Lf meeting the formula;

$$Lf \geq 2\times(R^2-(R-\Delta/2)^2)^{0.5}$$

$$R=30/0.125\times a1$$

in which R represents a curvature radius, a1 represents an outer diameter of the linear elements, a2 represents an outer diameter of the coating, Δ is given by $\Delta=(1/2)\times(n-1)\times(a2-P)$, in which n represents the number of the fine holes arrayed in a row, and P represents the pitch of the fine holes.

A ninth aspect of the present invention provides a connecting member of a resin composition, the connecting member having one end face in which a plurality of fine holes are arrayed in a horizontal row with a pitch P therebetween, each hole having a diameter of a φ, and guide pin insertion holes are formed on either side of the array of the fine holes, the process including the steps of: preparing the resin composition by mixing a resin with filler particles having a particle size distribution such that the largest diameter Dmax of the filler particles is larger than a space (P−a) formed between the fine holes, and the most frequent diameter Dm of the filler particles is smaller than the space (P−a); and using a mold to mold the prepared resin composition into the connecting member.

A tenth aspect of the present invention wherein the particle size distribution of the filler particles is selected such that a cumulative 20% filler particle diameter Dc is larger than the space (P−a), in which filler particles having diameters between the diameter Dc and the largest diameter account for 20% of the total number of the filler particles.

ADVANTAGES OF THE INVENTION

In accordance with the present invention, a predetermined amount of filler particles greater than the space formed between the fine holes is also mixed into the resin composition in order that during the molding filler particles flows such that relatively small-sized filler particles will pass through the space between the fine holes while relatively large-sized filler particles will not pass through the space.

As a result, density of the filler around or outside of the array of the fine holes is increased, so that the mechanical strength around the array of the fine holes is improved while at the same time manufacturing accuracy of the product is improved; the surface roughness is reduced between the fine holes where relatively small-sized filler particles are situated.

With respect to filler particle sizes, it is not necessary to use filler particles having the same maximum size. Hence a low-cost manufacturing can be realized.

Regardless of the maximum diameter of the filler particles, the resin containing those filler particles with a most frequent diameter smaller than the space formed between the fine holes will penetrate into that space. Therefore, the invention can provide a molded product with the fine holes having a smaller pitch than that of the conventional molded product

DESCRIPTION OF REFERENCE SYMBOLS

Figure 1:
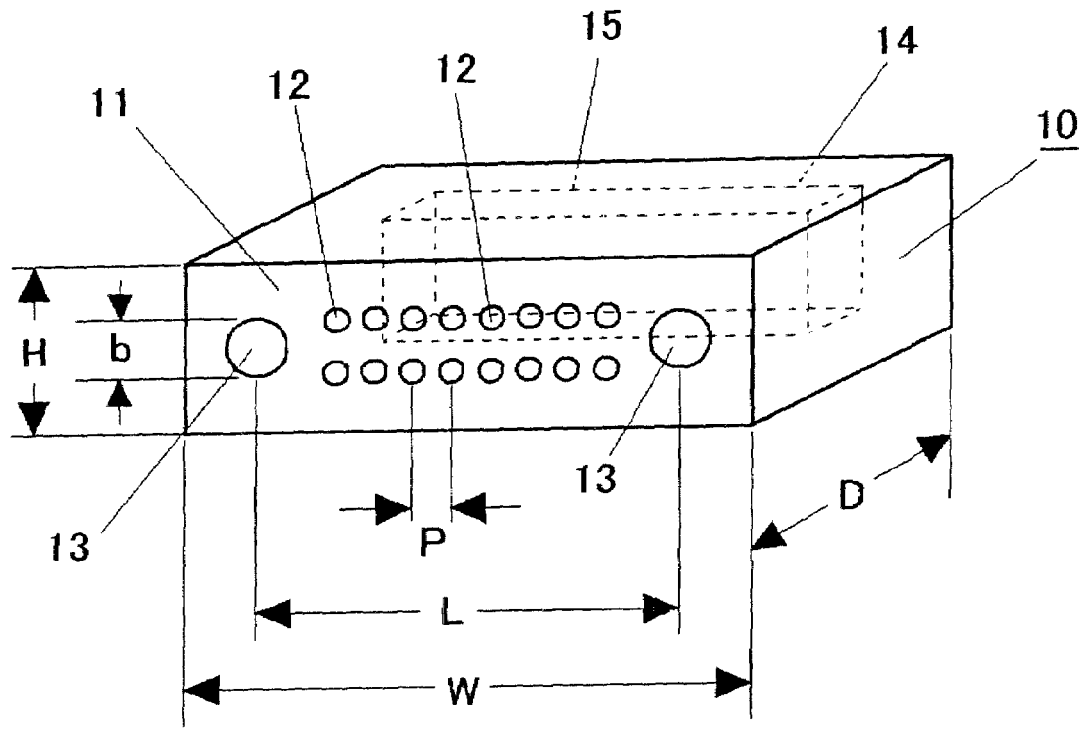
FIG. 1 is a partial perspective view showing an embodiment of the present invention.

10: connecting member
11: one end face
12: fine holes
12': array of fine holes
13: guide holes
14: surface
15: unit for arranging linear elements
16: cavity
20: mold
21: fine hole forming pins
21': leading end
22: array of fine hole forming pins
23: pins for forming guide pin holes
23: leading end
24: pin holder
25: pin mold
26: holes for holding fine hole forming pins
27: holes for holding guide pin hole forming pins
28: positioning member
29: hole into which the pin mold base is inserted
30: lower mold
31: upper mold
40: optical fiber ribbon
41: coating
42: bare optical fibers
42': end face

BEST MODES FOR CARRYING OUT THE INVENTION

A connecting member of the invention will be described in more detail in conjunction with the drawings.

First Embodiment

FIG. 1 is a partial perspective view of an embodiment of the present invention. As shown in FIG. 1, a connecting member 10 of the present invention is made of a resin composition and has one end face 11 in which a plurality of fine holes 12 are arrayed in two horizontal rows with one row above the other. Each fine hole 12 has a diameter of a $\phi$ or less. Also formed in the one end face 11 are guide pin insertion holes 13 which are each disposed on either side of the plurality of the fine holes 12. In addition, the connecting member 10 comprises a linear element arranging unit 15 (see broken lines) where linear elements are arranged.

Respective dimensions of the connecting member 10, specifically, height H, width W, depth D, pitch P between the fine holes 12, space (P−a) formed between the fine holes 12, vertical pitch h between fine hole 12 rows, diameter b $\phi$ of the guide holes 13, and pitch L of the guide holes 13 are given by: H=1200 μm, W=3400 μm, D=4000 μm, P=125 μm, a=80 μm, (P−a)=45 μm, h=250 μm, L≦2600 μm, and b=400 μm $\phi$.

Figure 2:
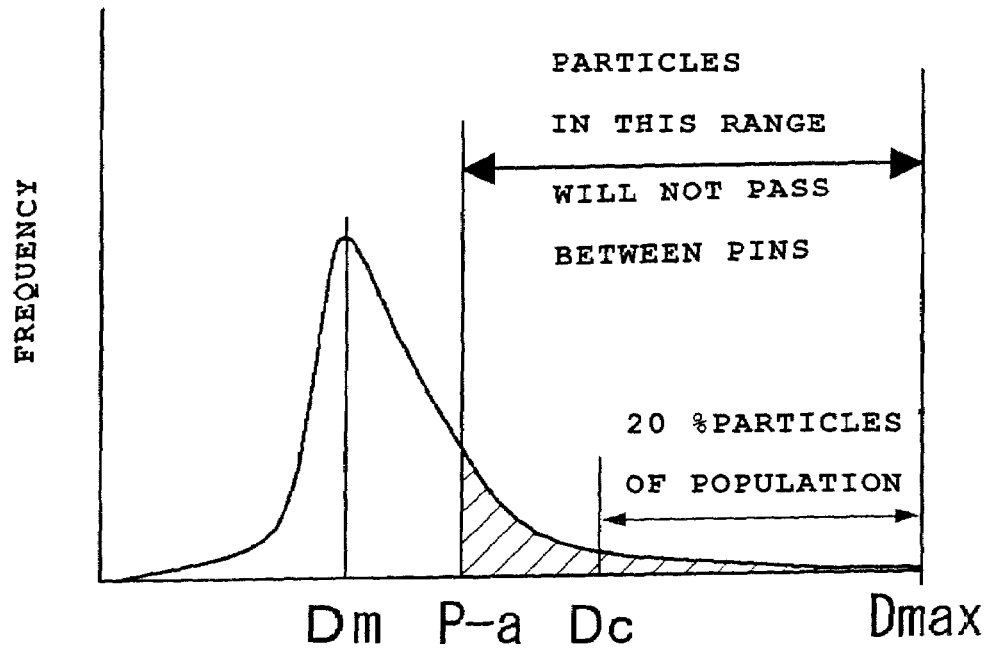
FIG. 2 is a frequency distribution of diameters of filler particles in a resin composition used in the embodiment of the present invention.

FIG. 2 is a graph showing a frequency distribution of diameters of filler particles in a resin composition used in one embodiment of the present invention. In FIG. 2, the vertical axis represents frequency of filler particles, and the horizontal axis denotes diameter of the filler particles. A filler particle diameter having the maximum or highest frequency (most frequent diameter) is denoted by Dm, the space formed between the fine holes by (P−a), the maximum or largest diameter of filler particles by Dmax, and a diameter of filler particles for which filler particles between that diameter and the largest diameter account for 20% of the total number of the filler particles is denoted by Dc. As indicated in FIG. 2, filler particles having diameters between (P−a) and Dmax will not pass through the space between the fine holes.

More specifically, filler particles contained in a resin composition used here have a size-frequency distribution such that the most frequent filler particle diameter (the one having the highest frequency) is near 35 μm which is smaller than the space (P−a) formed between the fine holes 12, and that the maximum diameter of the filler particles is about 100 μm$\phi$. Further, the resin composition of the embodiment contains filler particles such that filler particles having diameters between the space (P−a) formed between the fine holes 12 and the maximum filler particle diameter Dmax account for about 20% of the total. number of the filler particles contained in the entire resin composition.

Figure 3:
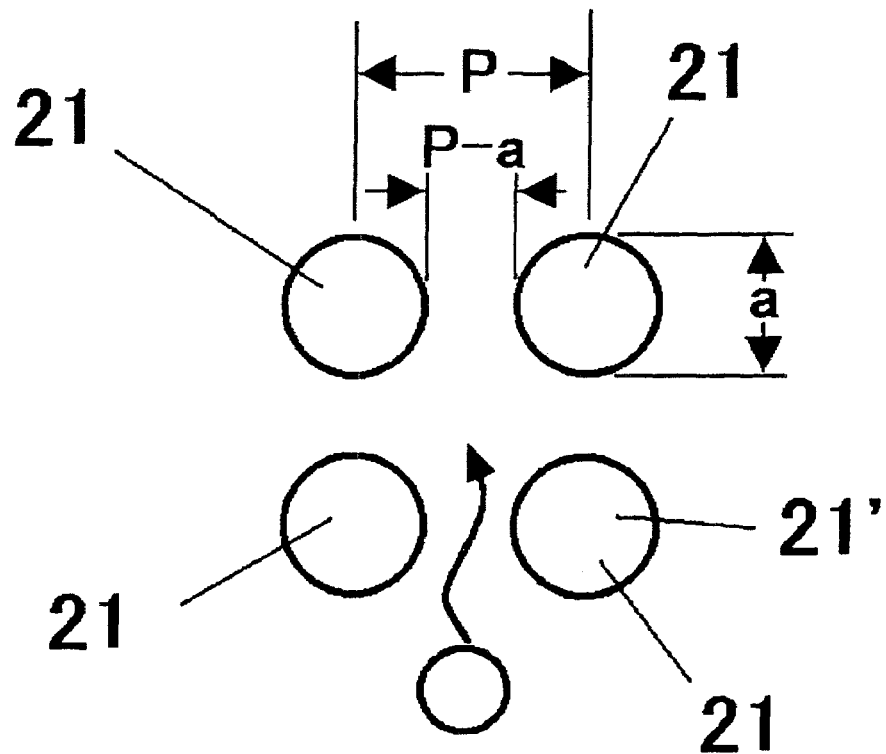
FIG. 3 illustrates how the resin composition flows during molding according to the embodiment.

FIG. 3 illustrates how resin composition flows during molding according to the embodiment of the present invention. In FIG. 3, fine hole forming pins are denoted by 21, the center-to-center distance or pitch therebetween by P, the diameter of the fine holes by a, and the edge-to-edge distance or space between the fine holes by (P−a).

As indicated in FIG. 3, only those resin composition materials containing filler particles smaller than the space (P−a) between the fine holes will penetrate into the space formed between the fine hole forming pins 21 to be arranged there, while resin composition materials containing filler particles larger than the space (P−a) will be arranged around or outside the array 21' of the fine hole forming pins. As a result, sizes of filler particles in the area around the array of the fine holes will be made larger than those of the filler particles in the space between the fine holes to increase the mechanical strength of the surrounding area around the array of the fine holes. Since the resin composition materials containing relatively small sized filler particles are arranged between the fine holes, the surface roughness is reduced and the manufacturing accuracy is improved.

With the present arrangement, an improved molding is realized, thus providing a smaller sized fiber optic connector with optical fiber multiplicity, higher density and integration features.

Second Embodiment

Figure 4:
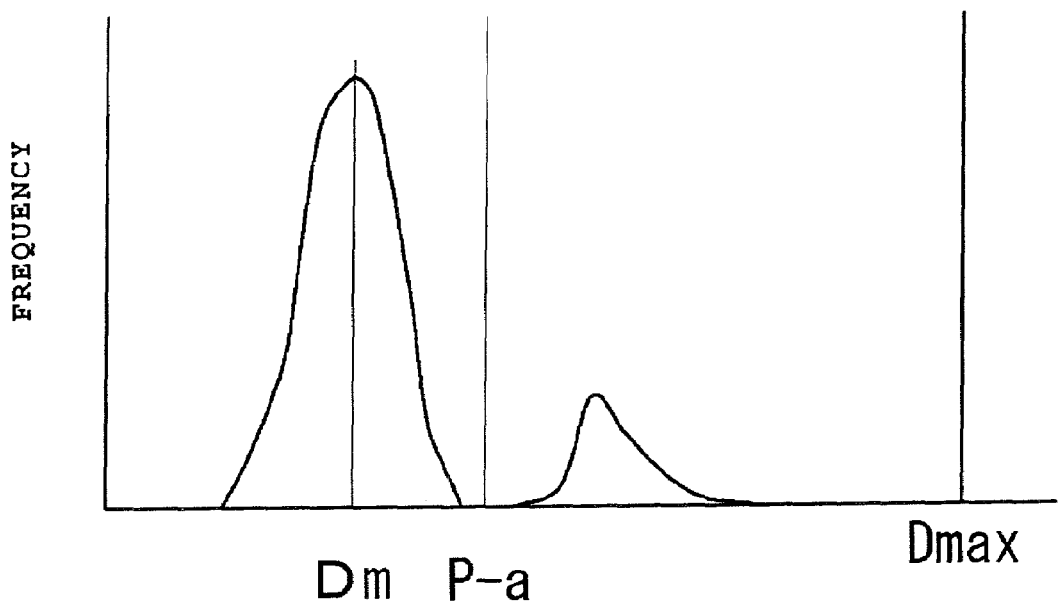
FIG. 4 is a frequency distribution of diameters of filler particles in a resin composition used in a further embodiment of the present invention.

FIG. 4 is a frequency-size distribution of filler particles in a resin composition used in a further embodiment of the present invention. The resin composition is prepared such that the frequency-size distribution of filler particles has a plurality of frequency peaks in which (P−a) is situated in or near a low frequency boundary formed between the peaks, and filler particles having diameters between (P−a) and the largest filler diameter Dmax account for about 20% of the total number of the filler particles in the resin composition. Connecting members using such a resin composition possess a high mechanical strength, and are improved particularly in terms of the accuracy of fine holes, attaining the high accuracy of 0.3 μm at best.

Third Embodiment

Figure 5:
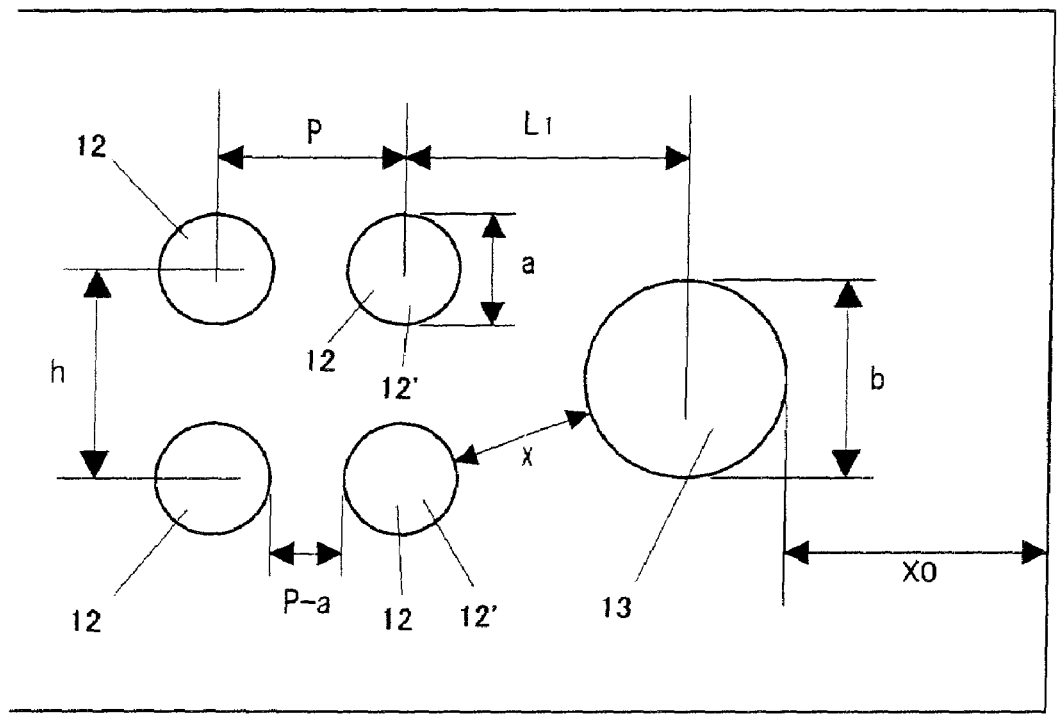
FIG. 5 illustrates relationship between fine holes and guide holes according to the further embodiment of the present invention.

FIG. 5 illustrate positional relationship between the fine holes and the guide holes according to a further embodiment of the present invention. In FIG. 5, the diameter of the fine holes is denoted by a, the distance between the fine hole rows by h, the diameter of the guide pin insertion holes by b, the distance or pitch between the fine holes by P, the edge-to-edge distance or space between the guide pin insertion hole and a nearest fine hole by x, and the center-to-center distance in a horizontal direction between the guide pin insertion hole and the nearest fine hole by L1.

More specifically, FIG. 5 shows a connecting member in which the ratio of the space x between the guide hole 13 and the nearest fine hole 12' to the space (P−a) between the fine holes 12, i.e., (x/(P−a)) is set to 10 or less. In the prior art, this ratio (x/(P−a)) has been set to a value greater than 10, typically in the range of 12.9 and 15.2. The resultant connecting member is inevitably made large in size. In accordance with the present embodiment, a smaller-sized connecting member is provided using the ratio (x/(P−a)) of 10 or less.

Figure 6:
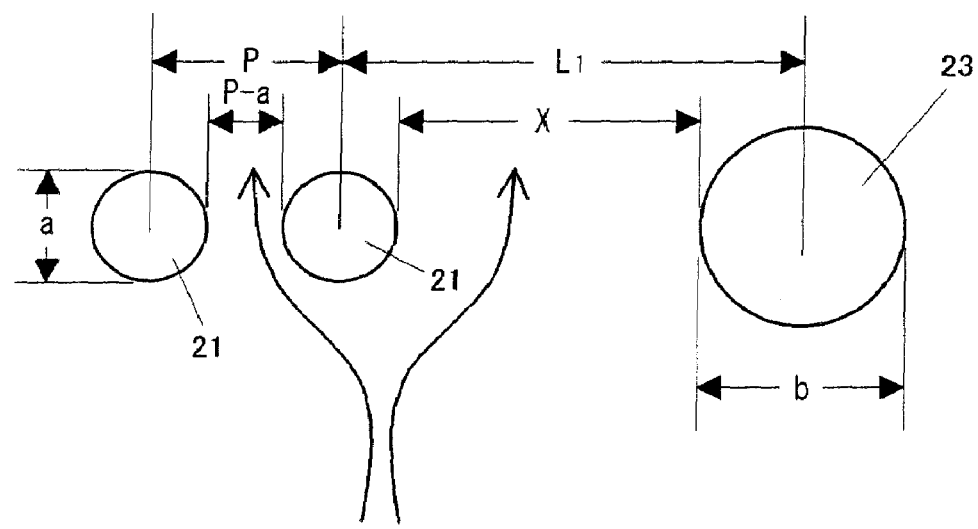
FIG. 6 illustrates relationship between fine hole forming pins and pins for forming guide pin insertion holes according to the further embodiment of the present invention.

FIG. 6 illustrates positional relationship between the fine hole forming pins and the guide pin hole forming pins according to the further embodiment of the present invention. More specifically, during molding in which the mold is filled with the resin composition materials, when there is a difference in flow rate (see FIG. 6) between the material flow in the space of length (P−a) between the fine hole forming pins 21 and the material flow in the space of length x between the fine hole forming pin 21 and the guide pin hole forming pin 23, the fine hole forming pin 21 is subjected to a rotation moment or torque so that the fine hole forming pin will be bent, thus reducing the dimensional accuracy of the fine holes. Therefore, it is desired that the resin composition materials have a uniform flow rate in the space x and the space (P−x).

In general, the dimension b of the guide hole forming pins 23 is larger than the dimension a of the fine hole forming pins 21. Accordingly, the guide hole forming pins 23 has a greater flow resistance so that assuming the same initial flow velocity, the area of the space x will experience a flow deceleration greater than that of the area of the space (P−a). Therefore, it is preferred that the ratio x/(P−a) is set to a value about 0.5 to 2.0 times b/a.

Connecting members were produced which meet this condition.

EXAMPLE A

Fine holes are for 12 optical fibers by 2 rows. P=125 μm, a=80 μm, L1=610 μm, h=250 μm, b=400 μmφ, P−a=45 μm, x=380 μm, x/(P−a)=8.4, b/a=5, x0=200 μm, and x/x0=1.9.

Other dimensions, i.e., height H, width W, depth D, pitch L between the guide holes (see FIG. 1) are 1200 μm for H, 3400 μm for W, 4000 μm for D, and 2600 μm for L, respectively. In the example, x is given by $x=(L1^2+(h/2)^2)^{0.5}-a/2-b/2$.

EXAMPLE B

Fine holes are for 6 optical fibers by 2 rows. P=250 μm, a=125 μm, L1=675 μm, h=250 μm, b=500 μmφ, P−a=125 μm, x=407 μm, x/(P−a)=3.3, b/a=4, x0=150 μm, and x/x0=2.7.

Other dimensions, i.e., height H, width W, depth D, pitch L between the guide holes (see FIG. 1) are 1200 μm for H, 3400 μm for W, 4000 μm for D, and 2600 μm for L, respectively. In the example, x is given by $x=(L1^2+(h/2)^2)^{0.5}-a/2-b/2$.

As a result, since the molded product has a similar rate of material contraction on right and left sides of the fine hole, the dimensional accuracy of the fine holes and the neighborhood thereof is not reduced. Further, since the asymmetric diversity of the density is relatively small, deformation of the holes due to application of weight during use of the molded product is not likely to occur. Further, since the material flow rate on the right side of the fine hole forming pin can be controlled to be similar to the material flow rate on the left side of the fine hole forming pin, the fine hole forming pin will not be bent, thus providing a high accurate arrangement. In either of the examples, the fine holes were manufactured with the dimensional accuracy of 0.5 μm or less.

The advantages over the prior art are as follows: In the prior art, dimensions or spaces are so large, as in x=1900 μm, x0=550 μm, x/x0=3.45, L=4600 μm, W=6400 μm, D=8000 μm, and H=2500 μm that the dimensional accuracy is low and resistance to deformation during the use is low. In contrast, the present examples are configured with optimal spaces and distances and, therefore, can provide a high accuracy connecting member with a high resistance to deformation during the use of the connecting member.

Setting (P−a) and x to appropriate values, respectively, as in the present examples results in a substantially uniform density of filler particles in the right and left neighborhoods of each fine hole.

Therefore, the advantages include: The material contraction ratio in the right neighborhood of a fine hole will not significantly differ from the material contraction ratio in the left neighborhood thereof. The dimensional accuracy in the vicinity of the fine holes is improved. Since the asymmetric diversity or unevenness of the material is minimized, deformation of the fine holes due to application of weight during the use is unlikely to occur.

Fourth Embodiment

Figure 7:
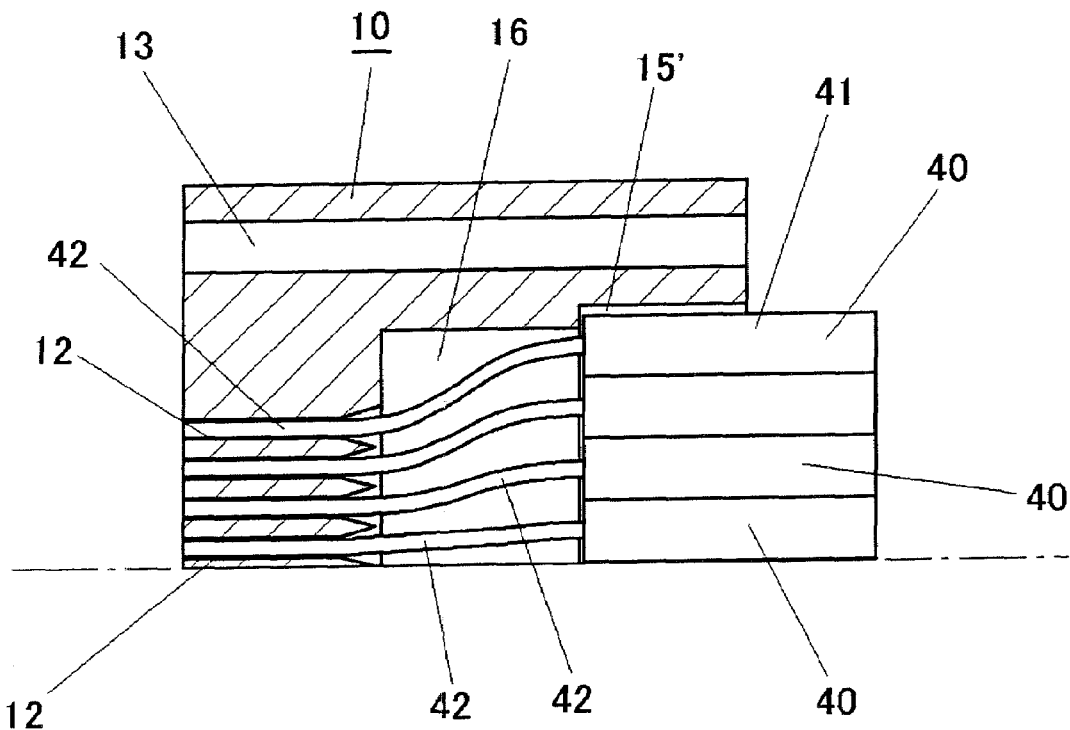
FIG. 7 is a cross sectional view showing a substantial part of a still further embodiment of the present invention.

FIG. 7 is a still further embodiment of the present invention, showing a cross section of a connecting member taken along an array direction of eight fine holes 12 thereof. The connecting member 10 according to the embodiment has eight fine holes 12 which are formed in one end of the connecting member. Formed in the other end opposite to the fine hole 12 arrangement is a unit 15' for arranging linear elements with a coating (i.e., a hole for receiving an optical fiber ribbon). Further, a cavity 16 is formed between the fine holes 12 and the coated linear element arranging unit 15'. Further, the fine holes 12 are adapted to receive respective bare optical fibers (linear elements) with the coating removed so that one end of the bare optical fibers is flush with one end of the fine holes 12. The optical fiber ribbon 40 including eight optical fibers is arranged in the coated linear element arranging unit 15' in the array direction of the fine holes 12. Thus, a part of the optical fiber ribbon 40 having eight optical fibers is arranged in the coated linear element arranging unit 15' such that the optical fibers corresponds in direction to the fine holes and bare optical fibers 42 obtained by removing the coating 41 are bent in the cavity 16.

It is recognized that the outmost bare optical fiber 42 is most bent. The outmost optical fiber 42 has to be arranged so as to have a bend radius greater than the permissible minimum curvature radius that assures a minimized optical transmission loss.

Accordingly, given the bend radius of the fiber by R, the cavity 40 has to have a length Lf meeting the formula:

$$Lf \geq 2 \times (R^2 - (R - \Delta/2)^2)^{0.5}$$

$$R = 30/0.125 \times a1$$

where R represents the curvature radius, a1 represents the outer diameter of the bare optical fiber, a2 represents the outer diameter of the coated optical fiber, $$\Delta = (1/2) \times (n-1) \times (a2 - P)$$

where n represents the number of the fine holes arrayed in a row, P is the center-to-center distance or pitch between the fine holes.

Using this arrangement, a connecting member with minimized transmission loss is provided.

Fifth Embodiment

Although the fine holes accommodate optical fibers as linear elements according to the fourth embodiment, the present invention can also be used to an application in which the fine holes accommodate other linear elements such as nylon tubes and glass capillary tubes. In such cases, the tubes are tightly fit in the fine holes without forming a space between the surface of the tubes and the walls of the fine holes. Therefore, working liquid in the tubes can be sealed and flow therein without leakage by abutting and connecting end faces of connecting members with the tubes incorporated therein. The present invention is particularly useful in such an application since the application requires high axial accuracy and high flatness of the end face such that even if the pressure within the tubes reaches as high as 2 Mpa, the molded product will keep its form without leakage of the liquid.

Other Embodiments

Although an array of a plurality of optical fibers has two rows in any of the above embodiments, the present invention can also be applied to an optical fiber array having a single, or three or more rows of optical fibers. In such cases, relatively large sized filler particles are arranged similarly in the outer area around the fine hole array, thus increasing the material hardness in the outer area while relatively small sized filler particles are arranged in the inner area between the fine holes, thus improving manufacturing accuracy of the fine holes.

Figure 8:
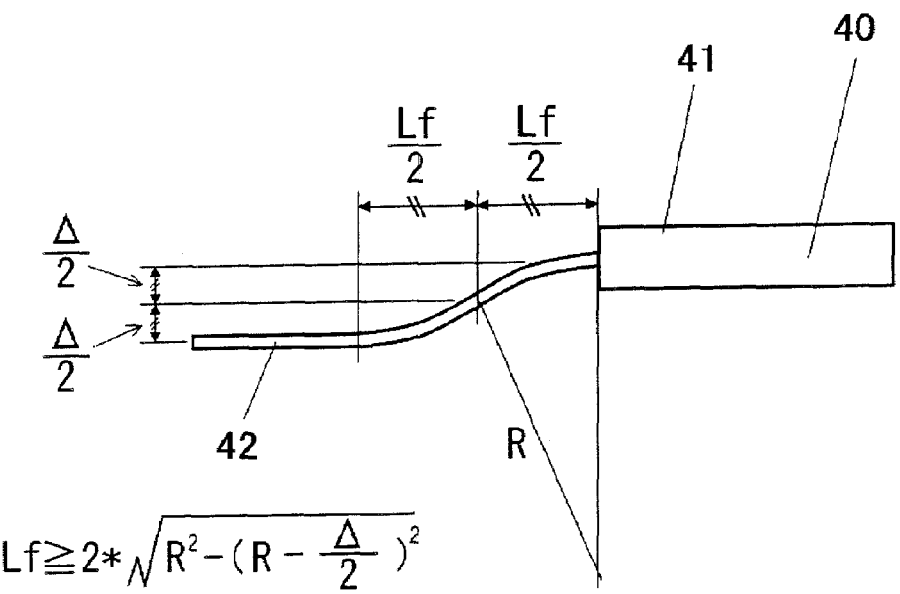
FIG. 8 is a view showing a part of the construction of FIG. 7.
Figure 9:
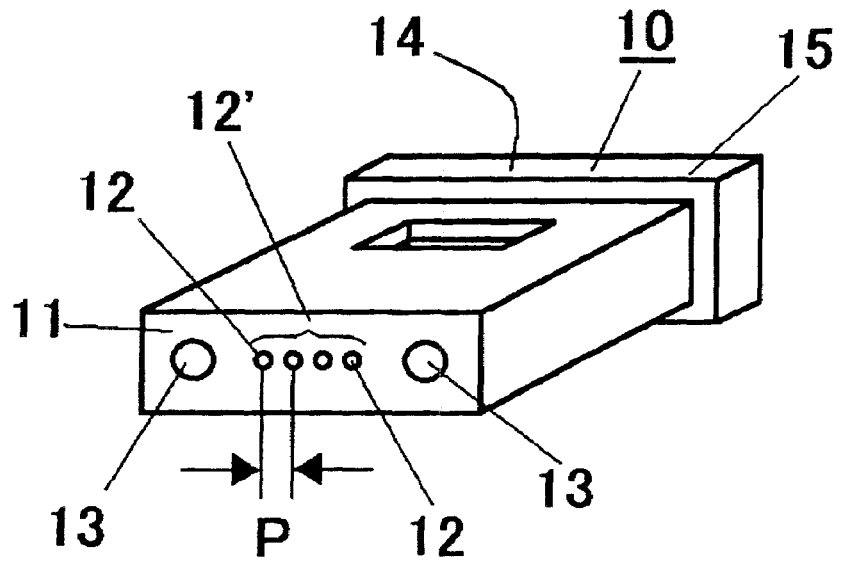
FIG. 9 is a view showing a conventional connecting member.
Figure 10:
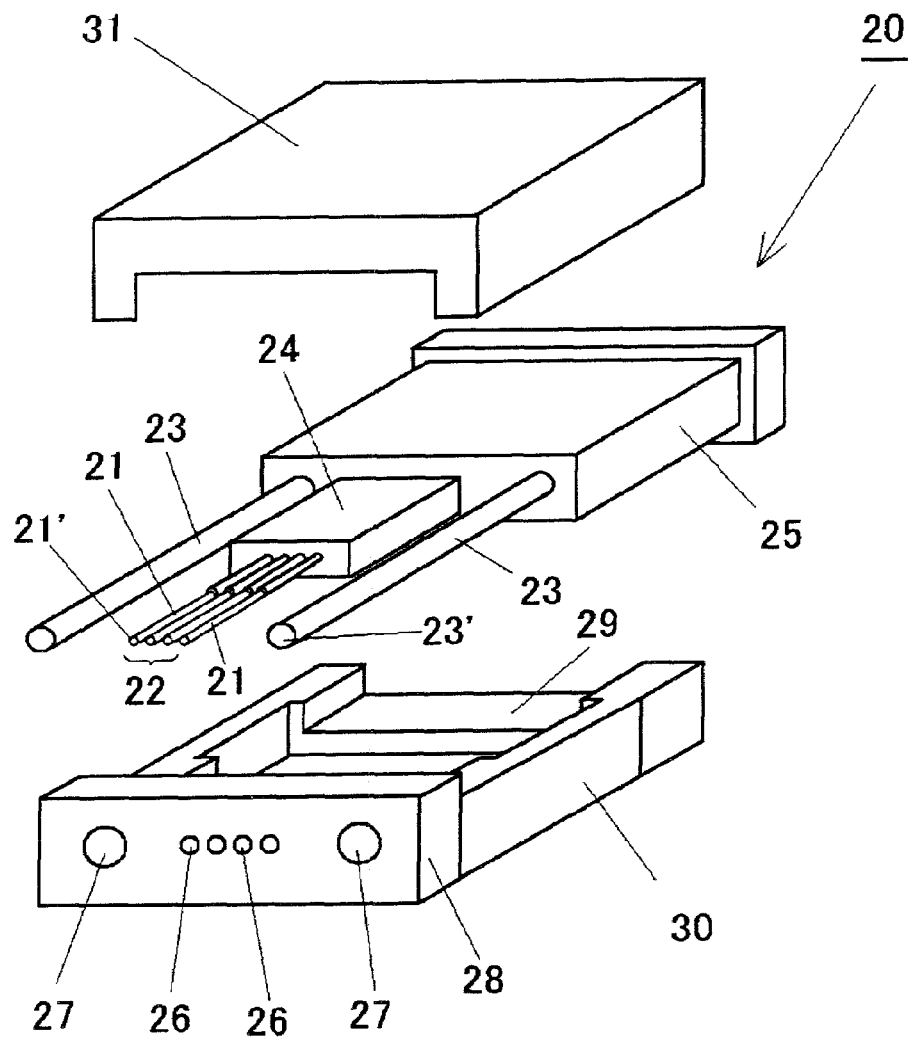
FIG. 10 is an exploded perspective view showing a conventional mold.
Figure 11:
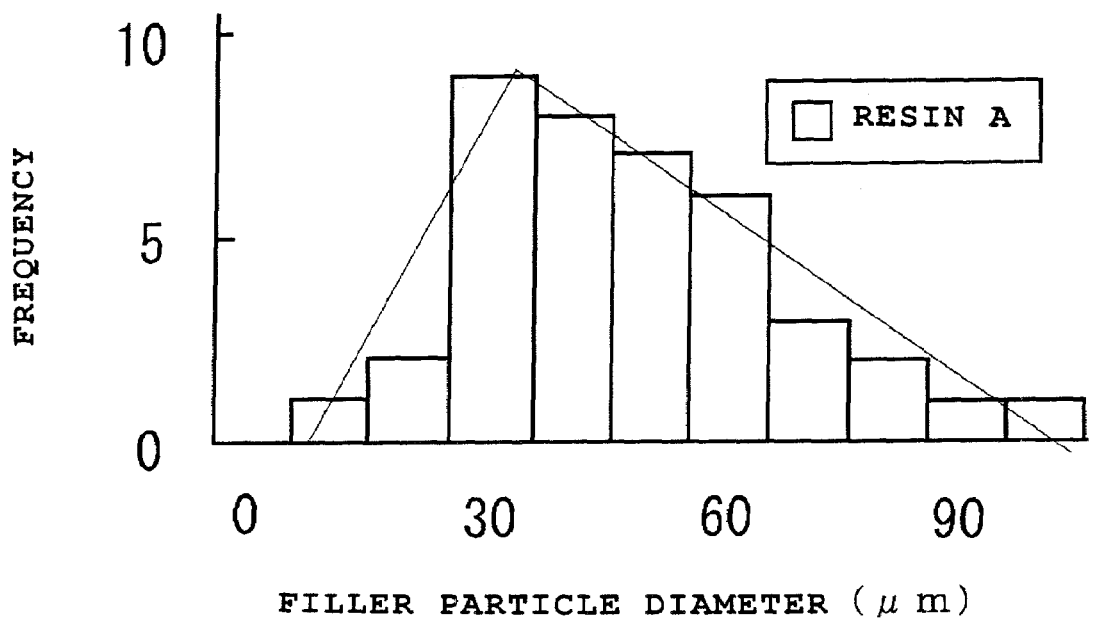
FIG. 11 is a graph showing a frequency distribution of sizes of filler particles in resin composition A.
Figure 12:
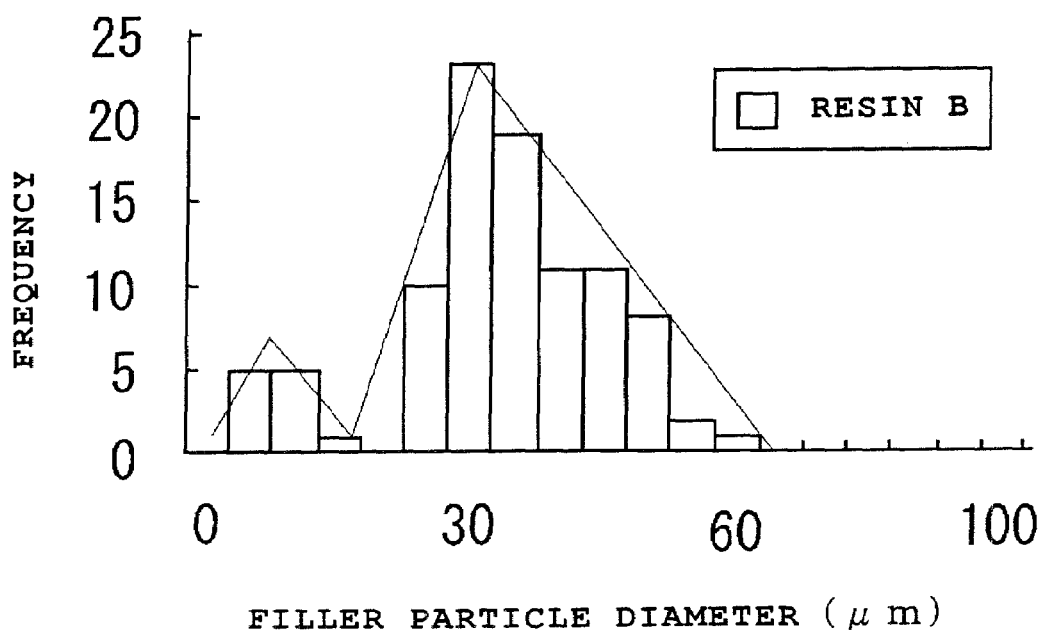
FIG. 12 is a graph showing a frequency distribution of sizes of filler particles in resin composition B.
Figure 13:
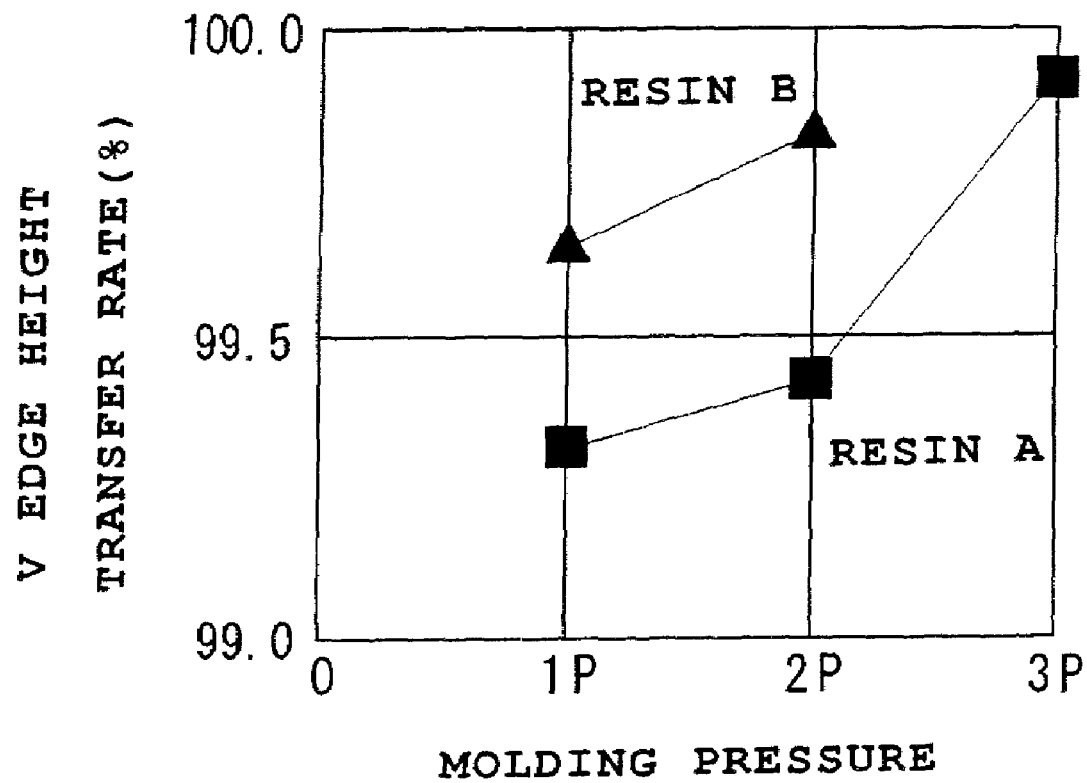
FIG. 13 is a graph showing a transfer rate property.
Figure 14:
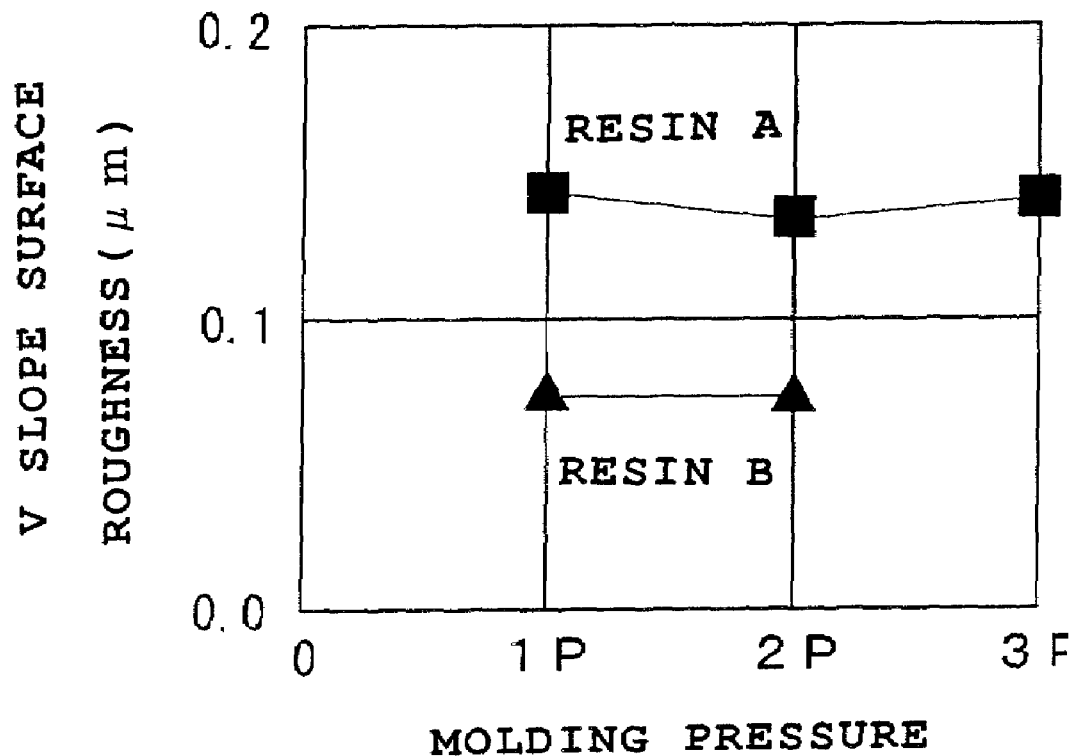
FIG. 14 is a graph showing a surface roughness property.

FIG. 2
Particles in this range will not pass between the pins
Particles in this range account for 20% of the total number of filler particles
Frequency
Filler particle diameter FIG. 4
Frequency
Filler particle diameter FIG. 8
Where R is given by R=30/0.125×a1 and represent curvature radius FIG. 11
Frequency
Particle diameter (μm)
Resin A FIG. 12
Frequency
Particle diameter (μm)
Resin B FIG. 13
V edge height transfer rate(%)
Resin B measured
Resin A measured
Molding pressure FIG. 14
V edge slope surface roughness (μm)
Resin B measured
Resin A measured
Molding pressure

The invention claimed is:

1. A connecting member made of a resin composition, comprising:
    one end face in which a plurality of fine holes are arrayed in a horizontal row with a pitch P therebetween, each hole having a diameter of a ϕ, and guide pin insertion holes are formed on either side of the array of the fine holes,
    wherein:
    the resin composition contains a resin and filler particles mixed therein; and
    wherein the filler particles contained in the resin composition have a particle size distribution such that a space (P−a) formed between the fine holes meets the following formula;

$$Dm < (P-a) < Dmax$$

in which Dmax represents the largest diameter of the filler particles, and Dm represents the most frequent diameter of the filler particles.

2. The connecting member according to claim 1 wherein the space (P−a) formed between the fine holes meets the following formula;

$$Dm < (P-a) < Dc$$

in which Dc represents a diameter of the filler particles for which filler particles having diameters between the diameter Dc and the largest diameter account for 20% of the total number of the filler particles.

3. The connecting member according to claim 1, wherein said plurality of fine holes are spaced by the pitch P therebetween to form an array in one horizontal row or a plurality of horizontal rows with a vertical distance therebetween,
    wherein:
    a row-to-row distance of the fine holes is given by h which is, however, zero when the number of the rows of the fine holes is one, a diameter of the guide pin insertion holes is given by bϕ, a space formed between each one of the guide pin insertion holes and nearest one of the fine holes is given by x, a center-to-center horizontal distance between each one of the guide pin insertion holes and the nearest one of the fine holes is given by L1, wherein:
the following formula is met;

$$1 < (x/(P-a)) < 10,$$

in which x is given by $x=(L1^2+(h/2)^2)^{0.5}-a/2-b/2$.

4. The connecting member according to claim 3 wherein the following formula is met;

$$0.5 < ((x/(P-a))/(b/a)) < 2.$$

5. The connecting member according to claim 4 wherein the following formula is also met;

$$x/x0 = 0.3 \text{ to } 3,$$

in which x0 represents a space formed between a side face of the connecting member and each of the guide pin insertion hole.

6. The connecting member according to any one of claims 1 to 5 wherein optical fibers are accommodated in the fine holes.

7. The connecting member according to any one of claims 1 to 5 wherein hollow tubes are accommodated in the fine holes.

8. The connecting member according to any one of claims 1 to 5, further comprising another end face opposite to the one end face, wherein the other end face is provided with a linear element arranging unit in which a plurality of linear elements covered with a coating are arranged, wherein a cavity is formed between the linear element arranging unit and fine holes of the connecting member, the fine holes are formed in the one end face, and the fine holes communicate with the linear element arranging unit via the cavity so that the linear elements with the coating removed are accommodated in the fine holes such that the linear elements with the coating removed are arranged with a bend in the cavity, wherein:
the cavity has a length Lf in a longitudinal direction of the fine holes, the length Lf meeting the formula;

$$Lf \geq 2 \times (R^2 - (R-\Delta/2)^2)^{0.5}$$

$$R = 30/0.125 \times a1$$

in which R represents a curvature radius, a1 represents an outer diameter of the linear element, a2 represents an outer diameter of the coating, $\Delta$ is given by $\Delta=(1/2)\times(n-1)\times(a2-P)$, in which n represents the number of the fine holes arrayed in a row, and P represents the pitch of the fine holes.

9. A process for producing a connecting member of a resin composition, the connecting member having one end face in which a plurality of fine holes are arrayed in a horizontal row with a pitch P therebetween, each hole having a diameter of a $\phi$, and guide pin insertion holes are formed on either side of the array of the fine holes, the process comprising the steps of:

preparing the resin composition by mixing a resin with filler particles having a particle size distribution such that the largest diameter Dmax of the filler particles is larger than a apace (P−a) formed between the fine holes, and the most frequent diameter Dm of the filler particles is smaller than the space (P−a); and using a mold to mold the prepared resin composition into the connecting member.

10. The process according to claim 9, wherein the particle size distribution of the filler particles is selected such that a cumulative 20% filler particle diameter Dc is larger than the space (P−a), in which filler particles having diameters between the diameter Dc and the largest diameter account for 20% of the total number of the filler particles.

* * * * *